United States Patent [19]
Kesling

[11] 3,758,947
[45] Sept. 18, 1973

[54] ELASTOMERIC ORTHODONTIC DEVICE

[76] Inventor: Peter C. Kesling, Green Acres, LaPorte, Ind.

[22] Filed: Dec. 17, 1971

[21] Appl. No.: 209,260

[52] U.S. Cl. ................................................ 32/14 A
[51] Int. Cl. ............................................ A61c 13/22
[58] Field of Search ..................................... 32/14 A

[56] References Cited
UNITED STATES PATENTS
3,052,029  9/1962  Wallsheim .............................. 32/14

OTHER PUBLICATIONS
American Journal of Orthodontics, Vol. 49 No. 7 July 63 1 page.

Primary Examiner—Robert Peshock
Attorney—Lloyd L. Zickert

[57] ABSTRACT

A device for producing elastic forces including traction forces in orthodontic treatment including an annular elastomeric body having a uniform cross section defined by radially inward and outward facing sides, wherein the radially inward facing side includes a pair of annular beveled faces converging radially inward to a line edge.

7 Claims, 12 Drawing Figures

PATENTED SEP 18 1973 3,758,947

ELASTOMERIC ORTHODONTIC DEVICE

This invention relates in general to orthodontic devices for performing orthodontic treatment, and more particularly to an elastomeric orthodontic device for producing various elastic forces when performing orthodontic treatment.

Heretofore it has been common to use the usual rubber bands or elastics for producing elastic forces in the mouth of a patient, but since these elastics have been commonly cut from tubing their life is quite short since they tear and break easily, and are susceptible to breakdown when subjected to mouth fluids. Some of the disadvantages of these elastics have been overcome by molded elastomeric devices like that disclosed in U.S. Pat. No. 3,530,583. The devices in the aforesaid patent have not always been satisfactory because of their round cross-sectional shape.

The present invention overcomes the difficulties heretofore known in elastic orthodontic devices by providing a molded device having a uniform cross section throughout where the cross section is such as to improve the fit with other orthodontic apparatus and to enhance separation of the teeth. More specifically, the cross-sectional shape is defined by inner and outer radially aligned sides wherein the inner side is V-shaped to provide better fitting to define separating forces when applied between teeth.

For example, when utilizing the device of the aforesaid patent as a separator, its round cross-sectional shape actually prohibits its immediate wedging between the teeth for the delivery of lateral separating forces and results in the device's excessive protrusion occlusally where it is likely to be damaged during chewing. Also, the round cross-sectional shape of the device of the aforesaid patent makes it difficult to engage it around small protuberances, or slip it between the coils of a loop, as is often desired.

The present invention also provides for a means of retaining the elastomeric device when threaded on a wire—a problem which is present when using conventional rubber bands or devices disclosed in the aforesaid patent that have openings larger than the cross section of the arch wire, which is usually the case.

The orthodontic device of the invention may be used as a bracket tie in place of the ligature tie for connecting an arch wire to a bracket. Further, the device may be applied between two or more points on other orthodontic apparatus to effect rotation, spaced retention or arch condensation. The device equally serves to produce inter or intra maxillary forces. The device may also be provided in multiples, or "chains," which may be cut to any length for easily creating a desired force between two or more points. When produced in multiple, it may also be used for bracket ties and for producing forces between spaced brackets.

When constructing the device of the invention in multiple or chain form, it includes a plurality of directly connected coplanar rings, the centers of which are aligned along a straight line and where adjacent connected rings have their outer cylindrical surfaces overlapping one another to provide a strong connection therebetween. Elongating or stretching a plurality of connected rings first causes the opposite sides of each ring arranged between connected adjacent points of adjacent rings to move toward each other and the rings to collapse before any stretching of the ring cross sections is experienced. Only a very gentle force is needed therefore to elongate the chain of rings when first causing the rings to collapse. It is most important that the gentlest forces possible be used in orthodontic treatment, and the light continuous forces defined by the chain form of rings of the present invention overcome the difficulties of the aforesaid patent where adjacent rings are interconnected by single strands of material which must stretch in order to increase the distance between adjacent rings, and to do so requires the exertion of a greater force than the collapsing of the ring-shaped connecting link as in the present invention. Accordingly, the device of the invention in the form of a string of interconnected rings provides more gentle inter or intra maxillary traction forces than devices heretofore known.

The device is preferably injection molded from a suitable elastomeric thermoplastic resin, which can readily withstand the usual cutting and tearing actions, and which is also resistant to the usual mouth fluids, thereby permitting a long life which enhances the quality of orthodontic treatment and eliminates those disruptions of treatment caused by failure of rubber elastics and subsequent failure to replace them.

It is, therefore, an object of the present invention to provide a new and improved elastomeric orthodontic device for producing an elastic force in performing orthodontic treatment.

Another object of the present invention is to provide an improved elastomeric orthodontic device for use in separating teeth.

Another object of this invention is to provide a new elastomeric device that will retain itself when threaded upon an orthodontic wire by means of a thin web or diaphragm in the center which must be punctured by the wire, or which has a slit in the web whose edges press on the wire, creating adequate friction to prevent the device from slipping off the wire.

Still another object of this invention is in the provision of a new and improved elastomeric orthodontic device in the form of connected rings for producing light continuous inter or intra maxillary traction forces to enhance orthodontic treatment.

Other objects, features and advantages of the invention will be apparent from the following detailed disclosure, taken in conjunction with the accompanying sheet of drawing, wherein like reference numerals refer to like parts, in which.

Figure 1:
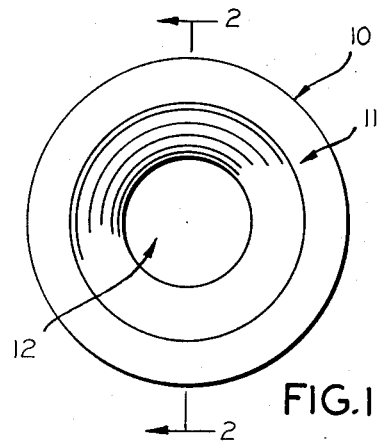
FIG. 1 is an elevational view of one form of the elastomeric device according to the invention.
Figure 2:
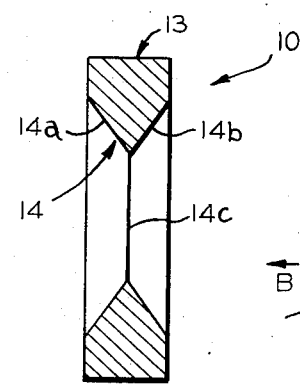
FIG. 2 is a vertical sectional view taken substantially along line 2—2 of FIG. 1.

Referring now to the drawings, and particularly to FIGS. 1 and 2, the form of the device according to the invention illustrated here is generally designated by the numeral 10, and which includes a body 11 in the form of a ring or annulus, and defining a central opening 12.

The body 11 includes an outer side 13 and an inner side 14 radially aligned with the outer side. The inner side 14 is V-shaped, wherein it includes a pair of faces 14a and 14b converging radially inwardly to define an annular line edge 14c. The outer side 12 is flat and arranged perpendicularly to the radial plane of the body, and spaced from the inner side by parallel opposed radially extending ends 15 and 16. While the radial thickness of the cross section (actually one-half the cross section) is illustrated as being greater than the axial thickness of the body, it should be appreciated that the axial thickness may be greater than the radial thickness if so desired. The annular faces of 14a and 14b have a bevelled relation relative to the overall device, and are symmetrical in that the angles between the faces and the radial plane of the device are equal. Accordingly, the cross section of the body is uniform throughout.

The elastomeric orthodontic device 10 will be injection molded from a suitable thermoplastic resin that will give the desired elastic properties, be resistant to mouth fluids, and be tough and durable for long life usage in the mouth. Any suitable commercial resin available may be employed, such as a polyvinyl chloride elastomer.

Figure 3:
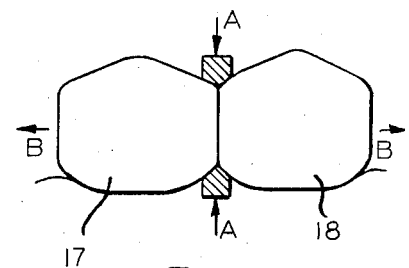
FIG. 3 is a sectional view of the device of FIG. 1 as illustrated in use for separating teeth.

The device shown in FIGS. 1 and 2 may be used as a bracket tie in place of ligature wires to elastically connect the arch wire and bracket. It may be used with edgewise, light wire, or any other type of bracket. It should be recognized that it can be made in any desirable size, and could also be employed to produce a pulling force between points on spaced orthodontic apparatus. FIG. 3 illustrates the use of the elastomeric device 10 as a separator for teeth when it is desired to apply a separating force so that bands can be placed and impressions can be made. Further, they may be used to separate teeth for the purpose of unlocking teeth and aiding in their eruption. Installation of the device between adjacent teeth is accomplished by stretching the device so that it has a thin cross section which can easily be slipped between the teeth on one side, wherein the device in its final position engages the embrasure areas so that the bevelled faces 14a and 14b apply camming action against the teeth as the device attempts to contract to effect separation. The line edge 14c would be aligned at the adjacent points of the teeth. As shown in FIG. 3, the device 10 functions to separate adjacent teeth 17 and 18 by seeking to contract and thereby apply a circumferentially uniform force A to effect separation in the direction of arrows B.

Figure 4:
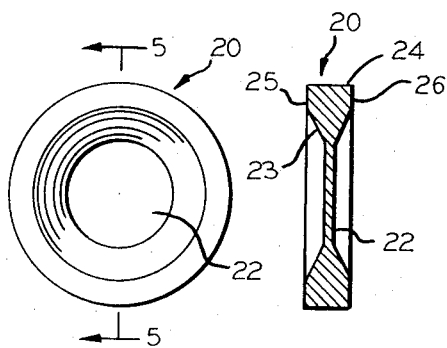
FIG. 4 is an elevational view of a modification.

The embodiment of FIG. 4, generally indicated by the numeral 20, differs from the embodiment of FIGS. 1 and 2 only in that no central opening is defined through the body 21 inasmuch as a thin web 22 closes the opening by extending across the line edge of the inner side 23. The outer side 24 and the ends 25, 26 are the same as the embodiment of FIGS. 1 and 2.

The device 20 may also be used as a separator wherein the web 22 will additionally provide a separating force between adjacent teeth, and wherein the web would be aligned directly between the teeth and the body serving to maintain the web in place between the teeth. Additionally, this embodiment is especially useful when applied as a bracket tie for light wire brackets, inasmuch as the arch wire would first be inserted through the web 22 by puncturing a hole through the web, which would assure maintaining the device on the wire by the frictional contact between the wire and punctured hole, and not losing it during the handling of the wire. Without the web the device might easily fall off and be lost, thereby delaying the work of the operator. Further, the web will function to hold the device in a predetermined location along the wire.

Figure 5:
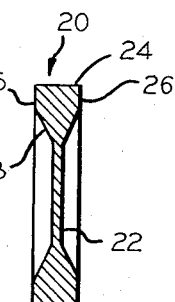
FIG. 5 is a vertical sectional view taken substantially along line 5—5 of FIG. 4.
Figure 6:
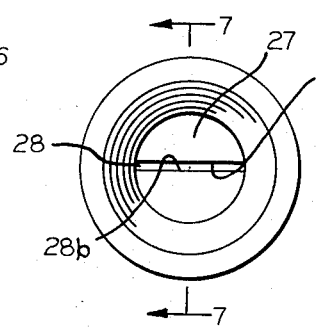
FIG. 6 is an elevational view of another modification.
Figures 7, 8:
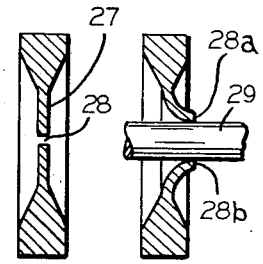
FIG. 7 is a sectional view taken substantially along line 7—7 of FIG. 6.
FIG. 8 is a view similar to FIG. 7, but showing the device mounted on an arch wire.

The embodiment of FIGS. 6 to 8 differs from that of FIGS. 4 and 5 only in that the web 27 is formed with a diametrically extending narrow slot or slit 28 through which the arch wire 29 may be pushed. The edges 28a and 28b frictionally engage the wire preventing the device from slipping off the wire.

Figure 9:
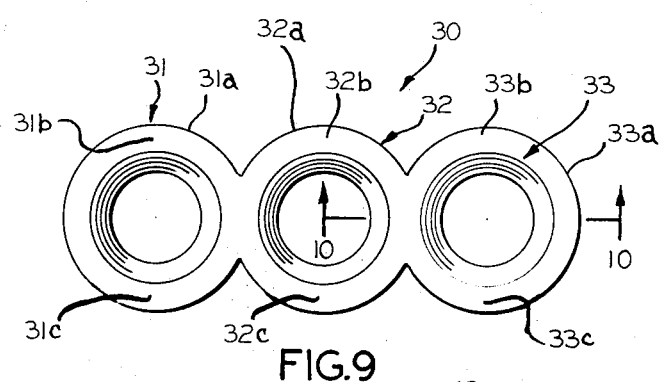
FIG. 9 is an elevational view of a still further modification of the invention.
Figure 10:
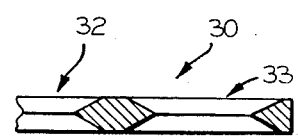
FIG. 10 is a detailed sectional view taken substantially along line 10—10 of FIG. 9.

The embodiment of FIGS. 9 and 10 differs from the embodiment of FIGS. 1 and 2 only in that it illustrates a plurality of the devices formed together as a chain wherein it can be especially used for producing forces between two points in the mouth. This device generally identified by the numeral 30 is shown in three ring-shaped bodies 31, 32 and 33, although it may be appreciated that any number may be made in a chain, and which could later be cut to a size by the operator to adjust for the desired length and force needed in a particular application. It is important to note here that the outer circumferences of connecting ring-shaped bodies overlap so as to provide sufficient strength in the connection and avoid malfunctioning where the bodies might tear apart. Note the overlapping of the circumferences 31a and 32a of bodies 31 and 32, and the overlapping of circumferences 32a and 33a of bodies 32 and 33. As in the other embodiments, this device will be molded of a suitable resin.

In operation, the embodiment of FIG. 9, here consisting of three connected rings as illustrated, to provide a traction force within the mouth, would be placed so that the outer end rings 31 and 33 would be hooked onto or attached to fixed appliances on the teeth, and wherein the intermediate ring 32 would act as a link between the outer rings 31 and 33. Elongation of the chain form of links would first cause the rings to essentially collapse wherein the opposite sides would move toward one another. Specifically, sides 31b and 31c of ring 31 would move toward each other, as would sides 32b and 32c, and sides 33b and 33c, all of which would enable an elongation of the device as a whole without causing actual stretching or distention of the cross sections of the rings. The traction force would equal the forces in the material attempting to restore the rings to their normal form which is illustrated in FIG. 6. Elongation of the chain form of rings beyond the collapsing of the rings causing the opposite sides to move toward and engage each other would require stretching or distention of the cross sections of the rings. Up to the point of stretching the cross sections of the rings, the forces developed are extremely gentle in nature and more gentle than the forces produced by the stretching of a cross section of the rings. Thus, a light, continuous force can be provided by the device of the invention between any two desired points by utilizing any number of connected rings, all of which will enhance orthodontic treatment, it being appreciated that one, two or more rings may act as a link between the outer end rings.

Figure 11:
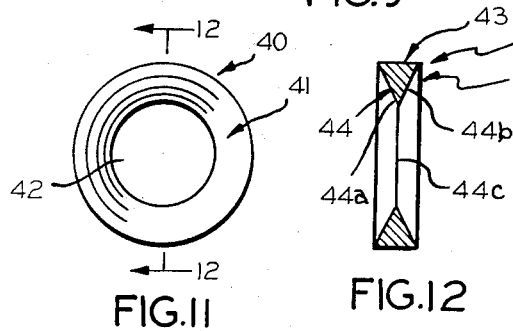
FIG. 11 is an elevational view of a further modification of the invention.
Figure 12:
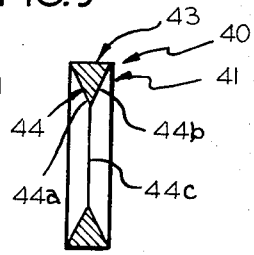
FIG. 12 is a sectional view taken substantially along line 12—12 of FIG. 11.

A further embodiment is shown in FIGS. 11 and 12 and generally designated as 40 which differs from the embodiment of FIGS. 1 and 2 in that the end faces are omitted whereby the opposed sides merge with each other. This embodiment includes a body 41 in the form of a ring or annulus defining a central opening 42, and having an outer side 43 and an inner side 44. The outer side 43 is flat and perpendicular to a plane extending centrally through the device, while the inner side is V-shaped and includes a pair of faces 44a and 44b converging radially inwardly to define an annular line edge 44c. This embodiment will operate identical to the embodiment of FIGS. 1 and 2 as a bracket tie or a tooth separator.

It will be understood that modifications and variations may be effected without departing from the scope of the novel concepts of the present invention, but it is understood that this application is to be limited only by the scope of the appended claims.

This invention is hereby claimed as follows:

1. An orthodontic device for applying elastic forces within a person's mouth in performing orthodontic treatment, said device comprising a molded ring-shaped body of elastomeric material having a uniform cross section throughout, said cross section defined by radially arranged inner and outer sides, the inner side being symmetrically V-shaped with the base of the V-shaped side being innermost, and a thin web across the V-shaped side closing the center of the body, said web having an axial thickness substantially less than the axial thickness of the body.

2. The device of claim 1, and a diametrically extending slit in said web of a width less than that of the archwire to thereby frictionally hold the device on the archwire before final placement.

3. An orthodontic device for use with orthodontic apparatus in a person's mouth to apply elastic tooth moving forces between a plurality of points, said device comprising a plurality of molded annular bodies of elastomeric material connected together in coplanar chain form relationship so the outer circumferences of connected bodies overlap, each body having a uniform cross section throughout, said cross section being defined by radially inward and outward facing sides, and the radially inward facing side including a pair of annular faces converging radially inwardly to a line edge, wherein the device when connected between two points in the mouth exerts tooth moving forces.

4. An orthodontic device for use with orthodontic apparatus in a person's mouth to apply elastic tooth moving forces between a plurality of points, said device comprising a plurality of molded ring-shaped bodies of elastomeric material connected together in coplanar relationship so the outer circumferences of connected bodies overlap and the centers thereof are aligned along a straight line, each body having a uniform cross section throughout except at the connection with another body, said cross section defined by radially arranged inner and outer sides, and the inner side being V-shaped with the base of the V-shaped side being innermost, wherein the device when connected between two points in the mouth exerts tooth moving forces.

5. The device of claim 2, wherein the outer side is flat and extends perpendicular to the radial plane of the body.

6. The device of claim 3, wherein radially extending end faces extend between the sides.

7. The device of claim 4, where the bodies define central openings therethrough.

* * * * *